(12) United States Patent
Golden et al.

(10) Patent No.: US 11,423,426 B2
(45) Date of Patent: Aug. 23, 2022

(54) CELL-ALLOCATION IN LOCATION-SELECTIVE INFORMATION PROVISION SYSTEMS

(71) Applicant: MOASIS GLOBAL CORPORATION, Austin, TX (US)

(72) Inventors: Steven Golden, Austin, TX (US); Ryan Golden, Austin, TX (US); Jason Mascari, Rockford, MI (US)

(73) Assignee: MOASIS GLOBAL CORPORATION, San Francisco, CA (US)

( * ) Notice: Subject to any disclaimer, the term of this patent is extended or adjusted under 35 U.S.C. 154(b) by 555 days.

(21) Appl. No.: 15/293,720

(22) Filed: Oct. 14, 2016

(65) Prior Publication Data

US 2017/0032399 A1 Feb. 2, 2017

Related U.S. Application Data

(60) Continuation of application No. 14/986,986, filed on Jan. 4, 2016, now Pat. No. 9,471,935, which is a
(Continued)

(51) Int. Cl.
*G06Q 20/00* (2012.01)
*G06Q 30/02* (2012.01)
(Continued)

(52) U.S. Cl.
CPC ..... *G06Q 30/0205* (2013.01); *G06Q 10/0631* (2013.01); *G06Q 30/0254* (2013.01);
(Continued)

(58) Field of Classification Search
CPC .......... G06Q 2220/00; G06Q 2220/10; G06Q 2220/16; G06Q 30/0205; G06Q 30/0254;
(Continued)

(56) References Cited

U.S. PATENT DOCUMENTS 6,414,602 B2 7/2002 Polyakov
6,519,525 B2 2/2003 Namba
(Continued)

FOREIGN PATENT DOCUMENTS

EP 1271458 1/2003
JP 2002082863 3/2002
(Continued)

OTHER PUBLICATIONS

Translated Brazilian Office Action dated Apr. 2020 for Patent Application No. PI1005920-2, counterpart foreign application of U.S. Appl. No. 13/220,018, 5 pages.
(Continued)

*Primary Examiner* — Dante Ravetti
(74) *Attorney, Agent, or Firm* — Lee & Hayes, P.C.

(57) ABSTRACT

Systems and methods for allocating cells within a virtual grid to content providers according to various priority and selection schemes are used to target content delivery to information playback devices in a geographically and/or application selective manner. The priority schemes, geographical selectivity, and application selectivity of the system and methods of the invention allow a content provider to specifically target a desired demographic with high cost efficiency and flexibility.

20 Claims, 1 Drawing Sheet

Related U.S. Application Data continuation of application No. 13/845,438, filed on Mar. 18, 2013, now Pat. No. 9,230,267, which is a division of application No. 13/220,018, filed on Aug. 29, 2011, now Pat. No. 8,892,460, which is a continuation-in-part of application No. PCT/US2010/026017, filed on Mar. 3, 2010.

(60) Provisional application No. 61/173,264, filed on Apr. 28, 2009, provisional application No. 61/157,224, filed on Mar. 4, 2009.

(51) Int. Cl.
| | |
|---|---|
| *G06Q 10/06* | (2012.01) |
| *H04W 4/029* | (2018.01) |
| *H04W 4/021* | (2018.01) |
| *H04L 67/52* | (2022.01) |
| *H04L 65/612* | (2022.01) |
| *H04L 67/53* | (2022.01) |
| *G06Q 30/08* | (2012.01) |

(52) U.S. Cl.
CPC ..... *G06Q 30/0261* (2013.01); *G06Q 30/0275* (2013.01); *H04L 67/18* (2013.01); *H04W 4/021* (2013.01); *H04W 4/029* (2018.02); *G06Q 30/08* (2013.01); *H04L 65/4084* (2013.01); *H04L 67/20* (2013.01)

(58) Field of Classification Search
CPC ........... G06Q 30/0275; G06Q 30/0261; G06Q 10/0631; G06Q 30/08; G06Q 50/10; H04W 4/029; H04W 4/021; H04W 4/02; H04L 67/18; H04L 67/20; H04L 65/4084; H04N 21/4722
See application file for complete search history.

(56) References Cited

U.S. PATENT DOCUMENTS

| | | | | |
|---|---|---|---|---|
| 7,584,023 | B1* | 9/2009 | Palmer | .................. A01G 27/00 239/69 |
| 7,636,574 | B2 | 12/2009 | Poosala | |
| 2002/0034954 | A1 | 3/2002 | Nohara et al. | |
| 2002/0190861 | A1* | 12/2002 | Wentworth | ........ G08B 21/0216 340/568.1 |
| 2004/0203885 | A1* | 10/2004 | Quaid | ................... G01S 5/0252 455/456.1 |
| 2005/0021472 | A1 | 1/2005 | Gettman et al. | |
| 2005/0148342 | A1 | 7/2005 | Sylvain | |
| 2005/0197894 | A1 | 9/2005 | Fairbanks et al. | |
| 2006/0085318 | A1 | 4/2006 | Cohoon | |
| 2006/0247971 | A1 | 11/2006 | Dresden et al. | |
| 2006/0253481 | A1 | 11/2006 | Guido et al. | |
| 2007/0184820 | A1 | 8/2007 | Marshall | |
| 2007/0239531 | A1 | 10/2007 | Beaufays et al. | |
| 2007/0250328 | A1 | 10/2007 | Dingus et al. | |
| 2007/0250383 | A1 | 10/2007 | Tollinger et al. | |
| 2007/0270132 | A1 | 11/2007 | Poosala | |
| 2008/0033802 | A1 | 2/2008 | McKenna et al. | |
| 2008/0062940 | A1* | 3/2008 | Othmer | ................... H04W 4/02 370/278 |
| 2008/0162037 | A1 | 7/2008 | Hasan Mahmoud | |
| 2008/0235731 | A1 | 9/2008 | Bryant et al. | |
| 2008/0312946 | A1* | 12/2008 | Valentine | ............. G06Q 20/382 705/64 |
| 2009/0003659 | A1 | 1/2009 | Forstall et al. | |
| 2009/0006190 | A1 | 1/2009 | Lucash et al. | |
| 2010/0312646 | A1 | 12/2010 | Gupta et al. | |
| 2011/0035458 | A1 | 2/2011 | Burnim | |
| 2011/0059748 | A1 | 3/2011 | Taylor et al. | |
| 2011/0307167 | A1 | 12/2011 | Taschereau | |
| 2012/0041817 | A1 | 2/2012 | Priyadarshan et al. | |

FOREIGN PATENT DOCUMENTS

| | | |
|---|---|---|
| JP | 2002132820 | 5/2002 |
| WO | WO0033163 | 6/2000 |

OTHER PUBLICATIONS

Brazilian Office Action dated Sep. 28, 2021 for Brazilian Patent Application No. PI1005920-2, a foreign counterpart to U.S. Pat. No. 9,230,267, 10 pages.

* cited by examiner

CELL-ALLOCATION IN LOCATION-SELECTIVE INFORMATION PROVISION SYSTEMS

CROSS-REFERENCE TO RELATED APPLICATIONS

The present application is a continuation application of U.S. nonprovisional patent application Ser. No. 14/986,986 filed on Jan. 4, 2016, which is a continuation application of U.S. nonprovisional patent application Ser. No. 13/845,438 filed on Mar. 18, 2013 (now U.S. Pat. No. 9,230,267), which is a divisional application of U.S. nonprovisional patent application Ser. No. 13/220,018 filed on Aug. 29, 2011 (now U.S. Pat. No. 8,892,460), which is a continuation-in-part under 35 U.S.C. § 120 of International Patent Application No. PCT/US10/026017, filed on Mar. 3, 2010, which designated the United States and claims the priority of provisional patent application Ser. Nos. 61/157,224 and 61/173,264 filed on Mar. 4, 2009 and Apr. 28, 2009, respectively.

FIELD OF THE INVENTION

The invention relates generally to information communication methods and systems. More particularly, the invention relates to methods and systems for allocating content provision rights to discrete geographical areas (cells) defined by a virtual grid to content providers in a system for providing information to information playback devices in a location and/or application-specific manner.

BACKGROUND

The last two decades have seen a revolution in how information such as news, advertising, or other content is transmitted to viewers over long distances. With the widespread use of the internet and information playback devices such as computers, electronic billboards, global positioning devices, and cellular telephones, the volume of information that is provided to individuals is expanding quickly. With so much information available, content providers are grappling with the problem of how to efficiently organize and transmit information to the demographic most likely to use it.

SUMMARY

The invention relates to the development of systems and methods for allocating cells within a virtual grid to content providers according to various priority and selection schemes. The cell-allocation systems and methods can be used to target content delivery to information playback devices in a geographically and/or application selective manner. The priority schemes, geographical selectivity, and application selectivity of the system and methods of the invention allow a content provider to specifically target a desired geo-location with high cost efficiency and flexibility. The systems and methods of the invention are advantageous in that they are accessible to content providers having limited to vast resources, can selectively provide real-time relevant information to a targeted location, and can use a bidding process that reduces inefficiencies.

The cell-allocation systems and methods according to the invention are particularly well-suited for use in information provision systems that include a location tracking system used in conjunction with a computer-implemented virtual grid system that divides a geographical area into discrete virtual cells to transmit information to the information playback devices according to their location and, optionally, in an application-specific manner. In one embodiment, the methods and systems of the invention can be used to allocate cells within a virtual grid for the purpose of allowing an advertiser to target a first specific advertisement to all properly configured cellular telephones (e.g., Apple's iPhones) located in a first cell that open a specific application (e.g., web browser or other application such as a game or utility), while simultaneously targeting a second specific advertisement to all properly configured cellular telephones that are located in a second cell other than the first cell that open a specific application.

The priority scheme of the cell-allocation systems and methods of the invention might employ an auction where one or more potential content providers bid on a given cell, or time slot or application within a given cell. An auction might, e.g., be in the form of an English auction, a Dutch auction, a sealed first-price auction, a Vickery auction, a buyout auction, or a combinatorial auction. The auction can be one with or without a reserve. For cells not allocated to a paying content provider, application developers can be given use of the cells for advertising their applications with little or no charge. An information playback device user selecting an application advertisement can be redirected to the application which can include one or more pay-per-click advertisements supplied by the cell-allocation system's owner. Revenue from such pay-per-click advertising can be shared by the application's owner and the cell-allocation system's owner.

In the system for selectively targeting content to information playback devices, the location of target information playback devices can be obtained using a location tracking system such as a global positioning system (GPS), cellular telephone communications network, WI-FI, or other system that tracks positions of devices according to latitude and longitude. The device's location can be transmitted to a server (e.g., over the internet and/or other communication network, using WI-FI or a cellular telephone communications network). Software on the server relates an information playback device's physical location to a corresponding location (e.g., a cell) on the virtual grid, and then causes the transmission of location-specific information (e.g., a targeted advertisement) via a wireless communication network (e.g., a cellular telephone communications network or WI-FI) to the information playback device using the devices' IP address or other suitable identifier.

This process can be performed for all the suitably configured information playback devices in a given cell within the virtual grid such that information can be selectively targeted to all the information playback devices in the cell. This process can also be performed simultaneously for multiple different cells (e.g., for at least 10; 100; 1,000; 10,000, or 100,000 cells) such that multiple different sets of information are targeted in a location-selective manner to the different cells in the system. Thus, moving an information playback device from one area to another can cause the information transmitted to the device to change. Although not required, the process can occur only in conjunction with an information playback device user's activation of a specific application or accessing a predetermined webpage.

Accordingly, in one aspect, the invention features a system including at least one server communicatively connected to a communications network; software installed on the at least one server and capable of: dividing a geographical area into a virtual grid including a plurality of cells, accepting bids for a cell within the plurality of cells from at least a first content provider and a second content provider, uploading content submitted from the content provider submitting a winning bid for the cell; and transmitting at least a portion of the uploaded content to an information playback device located in the cell, e.g., in a location and/or application specific manner.

In another aspect, the invention features a computer readable medium including software for: dividing a geographical area into a virtual grid including a plurality of cells, accepting bids for a cell within the plurality of cells from at least a first content provider and a second content provider, uploading content submitted from the content provider submitting a winning bid for the cell; and transmitting at least a portion of the uploaded content to an information playback device located in the cell, e.g., in a location and/or application specific manner.

Also within the invention is a method including the steps of: dividing a geographical area into a virtual grid including a plurality of cells; accepting bids for a cell within the plurality of cells from at least a first content provider and a second content provider; uploading content submitted from the content provider submitting a winning bid for the cell; and transmitting at least a portion of the uploaded content to an information playback device located in the cell.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The invention provides systems and methods for allocating cells within a virtual grid to content providers according to various priority and selection schemes. The cell allocation systems and methods can be used in a system for communicating information to information playback devices in a location- and/or application-selective manner. The information communicated can be advertising in text, graphics, pinpoints (which identify a certain area on the map that will interact with the grid), photographs, visuals, video and/or audio. Nonetheless the invention can be used to communicate any type of information including, without limitation, data, coupons, incentives, offers, promotions, sales, savings, free standing inserts, blogs, micro-blogs, tweets, pinpoints, bar codes, public announcements, emergency alerts, notes, action triggers, listings, and the like.

The method and systems described herein can be used to create a market for virtual fixed cells through bidding (e.g., option of cost per batch, cost per click, and/or cost per action) in order to place content such as advertisements, information, offers, incentives, coupons, and promotions. Auctioning a uniquely identified virtual cell (or set of cells) with a computerized electronic database of mapping records on a communications network (e.g., the Internet) can include creating a unique ID identifying the available cell to be bid on, generating an identification code to uniquely identify the cell, and then scheduling placement for the content to be placed in the cell. Cells can be presented for auction (bid) to an audience of participants through a worldwide web mapping module executing in conjunction with a computerized database. Bids can be received on the item from participants (e.g., content providers, companies, government entities, or individuals) through a communications network such as the Internet through a process that executes in conjunction with the computerized fixed coordinates database of mapping records.

A database-implemented electronic market system can include a data repository storing information corresponding to an inventory of one or more available cells within a virtual billboard grid and an electronic market (e.g., advertisers) that provides advertisements, coupons, incentives, sales, pinpoints, blogs, micro-blogs, Tweets, promotions or other information to the inventory of one or more items in the data repository. The systems described herein can utilize an interactive linkage between a search engine, content, and fixed cells available on a computer or wireless network. For example, in response to a search request at a search engine, a reference pointer (e.g., a cell within the virtual billboard grid, and/or in relation to the system's database) to dynamic information or content corresponding to the search request can be returned.

Various aspects of the invention may be embodied as a system, method, or computer program product (e.g., embodied in one or more computer readable media having computer readable program code embodied thereon), and might be in the form of hardware, software, or a combination of software and hardware. Computer readable media may be a computer readable signal medium (e.g., an electronic, magnetic, optical, electromagnetic, infrared, or semiconductor system, apparatus, or device, or any suitable combination of the foregoing) or a computer readable storage medium (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing).

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++, and procedural programming languages such as C. The program code may execute entirely on a user's computer, entirely on the remote computer or server, or partly on a user's computer and partly on a remote computer or server. A remote computer may communicate with a user's computer through any type of communications network, e.g., a local area network, a wide area network, or the Internet.

Systems for Selectively Communicating Information

Figure 1:
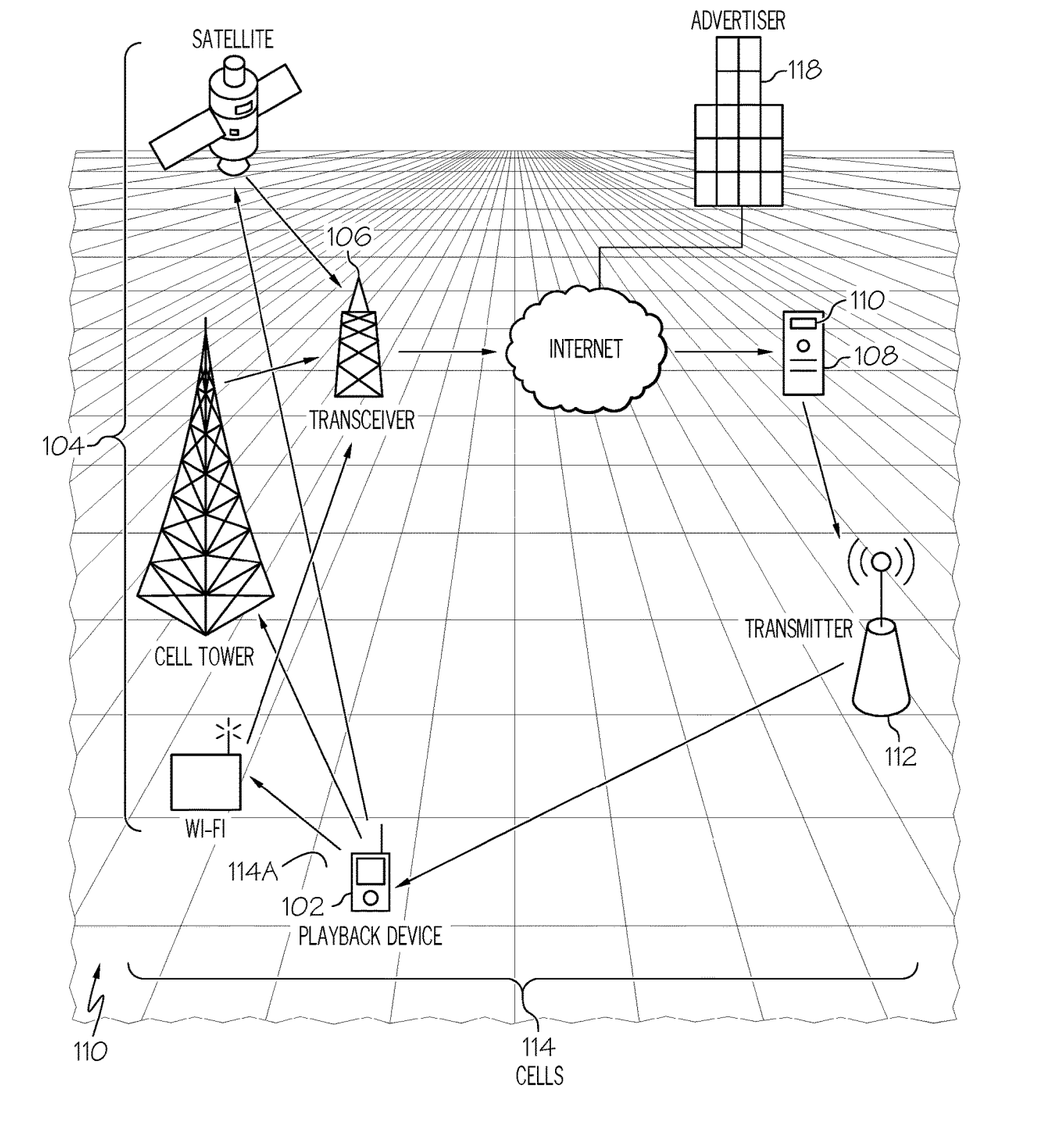
FIG. 1 is a schematic representation of the location-based communication system being used by an information playback device user.

Referring now to FIG. 1, in an exemplary embodiment, the systems and methods for allocating cells can be performed in conjunction with a system 100 for communicating information to an information playback device 102 in a location-selective manner. The system 100 for communicating information to an information playback device 102 in a location-selective manner can include a location tracking system 104 for determining the geographical location of the information playback device 102 (e.g., in terms of latitude and longitude) which can include the information playback device 102 which can be configured to transmit signals to the location tracking system and receive signals from an external source, a transceiver 106 for receiving positional information from the location tracking system 104, a server 108 in communication with the transceiver 106 and including mapping software and software for creating a virtual grid, a set of information stored in a database 110 on the server 108, and a transmitter 112 in communication with the server 108 and capable of transmitting the set of information to the information playback device 102 in a location-selective manner Each of the foregoing components can be included in multiplicity, e.g., the invention may include one or more computers, information playback devices, location tracking systems, transceivers, different sets of information, and transmitters. The mapping software and virtual grid creating software may be installed on one or more of the servers (that may be networked). The information playback device 102 can be communicatively connected to the location tracking system.

The location tracking system 104 can be any system capable of determining the geographical location of an information playback device. For example, the location tracking system can be a GPS (e.g., the NAVSTR GPS) or a triangulation system that determines a devices location by the strength of its signals as measured by multiple signal monitors (e.g., cell towers or WI-FI transceivers). In some cases, the positional information obtained by the location tracking system 104 might round coordinates to less specific locations or otherwise use fuzzy logic processing to reduce the specificity of the specific positional data.

The information playback device 102 can be any suitable device capable of conveying information to a user, transmitting positional information to the location tracking system 104 and receiving information sent from the transmitter 112. The information playback device 102 can be portable or stationary (e.g., fixed in place such that it is difficult to move). Examples of such devices include cellular telephones, personal digital assistants, satellite television transceivers, satellite radios, devices connected to a wireless computer network, computers (e.g., netbook and notebook computers), fixed digital billboards, wrist watches and MP3 players with wireless communication capability, transit digital billboards and or devices, and GPS navigation devices.

The transceiver 106 for receiving positional information from the location tracking system 104 can take the form of any device capable of receiving a signal from the information playback device 102 and conveying such signal to the server 108. Thus the transceiver 106 can be a device that includes an antenna, modulates and demodulates signals, and converts such signals from one form to another. The transceiver 106 might operate over wired and/or wireless communication networks. As an example, the transceiver 106 can be configured to communicate data via IEEE 802 wireless communications (e.g., 802.11, 802.16, WPA, WPA2, TDMA, CDMA, WCDMA, GSM, GPRS, UTMS, 3G, 4G, EUTAN, UMB, OFDM, or LTE systems). The transceiver 106 might also be configured to communicate over a wireless communication link using a communication protocol such as TCP/IP. In some embodiments, the transceiver 106 can be integrated into the information playback device 102 itself. In addition, hard-wired devices could be used, e.g., a network of roadside billboards each assigned an individual code that can be transmitted.

The server 108 can be a computer or set of computers running one or more computer programs such as a mapping program and/or a program for creating a virtual grid that divides a given geographical area into two or more discrete cells. The server 108 can be in communication with the transceiver 106 and transmitter 112. The server 108 might also include a memory store that stores data corresponding to information (e.g., advertising) which can be transmitted to the information playback device 102, which can be remotely located (e.g., 1, 2, 5, 10, 50, 100, 500 or more km) from the server 108. The information stored in the memory store might include audio and/or visual data. The mapping software can be any program capable of running on the server 108 and processing positional data of the information playback device 102. The virtual grid software can be any program that can divide a given geographical area into at least two discrete (or in some cases overlapping) virtual cells 114. For example, the entire planet Earth, a country, a continent, a city, or a region may be overlaid with a virtual grid 116 generated by the software. In an exemplary embodiment, each of the plurality of cells 114 can be a regular or irregular polygon (e.g., a quadrangle, a square, a rectangle, a rhombus, a triangle, a pentagon, a hexagon, or an octagon) defining an area of greater than or equal to 0.1, 0.5, 1, 2, 3, 4, 5, 6, 7, 8, 9, 10, 15, 25, 50, 75, 100, 200, 300, 400, 500, 1000 or more square km. In other embodiments of the system, each cell of the virtual grid 116 can have an area of about 0.25 km by 0.25 km, 0.5 km by 0.5 km, 0.75 km by 0.75 km, 0.5 km by 1 km, 1 km by 1 km, 1.5 km by 1.5 km, 1 km by 2 km, 2 km by 2 km, 1 km by 3 km, 5 km by 5 km, 10 km by 10 km, 25 km by 25 km, 50 km by 50 km, or 100 km by 100 km. In another embodiment, each of the plurality of cells 114 can be defined by longitude and latitude degrees such as greater than or equal to 0.0001, 0.001, 0.01, 0.1, 1, or 2 degrees longitude by 0.0001, 0.001, 0.01, 0.1, 1, or 2 degrees latitude. The cells 114 may also be non-polygonal, of different sizes and/or shapes, and/or defined by population size (e.g., 1000-2000; 2000-3000; 3000-5000; 5000-10,000; 10,000-25,000; 25,000-50,000, 50,000-100,000; or greater than 100,000 people in each cell).

The transmitter 112 can be communicatively connected to the server 108 and can be capable of transmitting a signal embodying the information to be sent to the information playback device 102. The information is transmitted to information playback devices that are physically located within the cell or cells 114 of the virtual grid 116 being targeted by an advertiser or other information provider 118. For example, the information provider 118 could choose to deploy targeted information to information playback devices located in a particular neighborhood or city. In another example, the advertiser could target information to cells located in the path of a cruise ship so that the information can be received by information playback devices aboard the cruise ship. In still another example, the information playback device 102 could be a satellite radio, GPS navigation system, or electronic billboard installed in an automobile.

In an exemplary embodiment, the systems and methods of the invention can be used to selectively target advertisements to an information playback device located in a particular cell, optionally in an application-specific manner Upon turning on the information playback device 102 or opening a particular application in the information playback device 102, a signal is transmitted from the information playback device 102 to the location tracking system 104. The location tracking system 104 converts the signal from the information playback device 102 to data corresponding to the physical location of the information playback device 102. The data corresponding to the physical location of the information playback device 102 is then transmitted to the server 108 (e.g., via a transceiver such as the information playback device itself). The server 108 processes this data and assigns the information playback device 102 to a cell 114a in the virtual grid 116. The server 108 also causes a signal embodying the advertisement to be transmitted to the information playback device 102 which then converts the signal to an audio and/or visual file that is played on the information playback device 102 to generate the advertisement. The information may be displayed as "pop-up" type information. The information might also be configured as a file that can be saved in a memory store on the information playback device 102 (e.g., a coupon or incentive that can be saved for use).

In an example, a mobile phone user may enter into a cell 114a of the virtual grid 116 where an advertiser has submitted a winning bid (e.g., the highest monetary bid or a bid with the highest priority score calculated from a factor other than just a monetary amount). The system provider may offer placement of the information through an existing website such as, for example, Facebook™. When the user accesses the Facebook™ website on the user's mobile phone, the advertiser's information can be displayed, for example, in an information space located at the top of the web page or in another location on the web page.

In an exemplary embodiment, the user may be given several options to interact with the information deployed through the system 100. Interactive options can include features permitting the user to view the advertiser's location on a map, link to a web page associated with the information, view a video or audiovisual version of the information, listen to an audio-only version of the information, call a telephone number associated with the advertiser or with the information, share the information with another person, and/or save the content to a memory store.

In one embodiment, the systems and methods of the invention utilize integrated media streaming to deliver location relevant information. For example, content providers can target various media streaming services to deliver advertisements/offers in a video and/or audio format (e.g., MP3, WAV, AIFF, MOV, FLV, MPG, MV3, AVI, DIVX, and DVB formats). Video resolutions can be, e.g., standard definition or high-definition. Audio genre targeting can be: Alternative, Blues, Children's Music, Christian & Gospel, Classical, Comedy, Dance, Electronic, Fitness & Workout, Hip-Hop/Rap, Indie Spotlight, Jazz, Latino, Metal, Pop, R&B/Soul, Reggae, Rock, Singer/Songwriter, Soundtrack, Vocal, World and audio books. Video genre targeting can include: Action & Adventure, Animation & Cartoons, Comedy, Drama, Family, Food & Leisure, Home & Garden, Horror & Suspense, Music, News & Information, Other, Reality & Game Show, Science Fiction, Sports, Talk & Interview, Videogames, podcast and Web. Streaming services can include: iTunes, Lala, MySpace's Imeem, Hulu, mobile networks (such as CBS Mobile, ESPN Mobile, etc.), and devices such as Sirius Radio Devices, FLOTV Devices, Verizon VCAST, AT&T mobile TV, Tablets, and Audio Book Devices. Content delivery can occur after a trigger event or at predetermined time intervals and/or numeric intervals (e.g., every 3 songs/videos or every 10 minutes), where the application acquires information playback device's 102 geographical coordinates and queries the database 110 to deliver the audio or video content with the highest bid in the relevant cell, and targets the genre of media the information playback device 102 is currently displaying.

As an example of a video streaming application, a user is watching Saturday Night Live on a mobile Hulu application on the information playback device 102 while walking down the street in New York. After each predetermined interval (e.g., every 10 minutes), the application will determine the information playback device's 102 coordinates, and the system's 100 code will interpret those coordinates, determine how it relates to the virtual grid 116 to determine the user's current cell location, and then serve the location appropriate video formatted advertisement to the device as described above. As an example of an audio streaming application, a user is listening to Alternative music on the mobile Pandora application. After each predetermined interval (e.g., every 3 songs), the application will determine the information playback device's 102 coordinates, and the system's 100 code will interpret those coordinates, determine how it relates to the virtual grid 116 to determine the user's current cell location, and then serve the location appropriate audio formatted advertisement to the device as described above. Live broadcasts sent to the playback device 102, can include a trigger signal which instructs the system 100 to pause the broadcast and transmit a location relevant advertisement that would play on the device 102, which could be at predetermined intervals. The advertisement could also include a trigger signal which instructs to the system to resume the broadcast on the device 102. The device 102 itself may be programmed to determine when content is played. In one embodiment, the system 100 can be configured to display a banner image on the device 102 that is related to the audio or video advertisement playing on the device 102.

In another embodiment, the system 100 is configured to deliver location relevant brands in relation to category (e.g., by interacting with websites like Guvera). A user of the device 102 selects a brand that will pay for each piece of content (e.g., music, tv, or movie) searched for. A user then visits the brand's channels which provide access to other content of the same genre. In this embodiment, the system 100 can be configured to not post advertisements on the device 102 that cannot be clicked past. The system 100 can allow a content provider to create a channel, choose a content style for that channel, and choose which target audience will be allowed to access that channel. These channels can interact with the system 100 to granulize messages to the consumer and provide location targeting delivery or solutions. For example, Company X has a channel targeted towards females 21-25 in Chicago who like dance music. Using the system 100, Company X can target this demographic and provide advertisements to appropriately located cells that encourage the users of the channel to visit Company X's stores (e.g., located in the selected cells).

Cell Allocation

The system 100 can provide online features to register for the system's services as well as features that permit content providers to add, manage, and remove their content campaigns. The system may also provide features that allow a content provider to place bids for information placements in particular cells or for a particular area selected by the content provider. Cells can be allocated to content providers according to various priority and selectivity schemes including those based on bid amounts, cell location, time/date slots, and target categories (e.g., applications in selected areas of interest).

In a typical configuration of a cell-allocation system, a program running on a computer creates a virtual grid overlaying an area such as the world or a country or region such as the United States of America, North America, Asia, South America, or Europe. Information placement in one or more cells within the virtual grid is offered to content providers. Upon acceptance of an offer, the cell allocation system permits the cell or cells to be used by the selected content provider to transmit content to information playback devices within the cell or cells, e.g., in a location- and/or application-specific manner.

As an example, one or more (e.g., 1, 2, 3, 4, 5, 10, 100, 1000 or more) content providers can place at least one bid for information placement rights within a bid area. The bid area can include one or more cells of the plurality of cells (e.g., a set of cells determined by a radius from a fixed position such as all cells within 10 km of location X). A winning bid (e.g., a highest bid placed by a content provider) can be selected from among the bids submitted by the different content providers. The information of the content provider submitting the winning bid can then be deployed within the bid area. A non-revenue generating developer application advertisement can be transmitted to those cells lacking a paying advertiser. Deployment of information using this method may be accomplished via a software application installed on the wireless device.

In one example of the cell-allocation system, a hierarchal method is used to allocate cells to content providers. In this example, if two companies (Company X and Company Y) are competing for the rights to the same cell, variables used to decide the winner could include at least two (e.g., 2, 3, 4, or 5) of: (a) the bid amount, (b) lowest schedule priority number, (c) highest application priority number, (d) which company made the first bid (timestamp), and (e) a budget range for bidding. Thus, in an example of a hierarchal method, the company with the higher bid would win rights to the cell (e.g., Company X with a $3 bid would prevail over Company Y with a $2 bid). If, however, the bid was tied, then the system would consider each company's schedule priority number. The schedule priority number correlates with the amount of total hours the advertiser wants to be displayed. The lower the total hours bid on by a content provider, the higher the schedule priority number that content provider will be assigned. Thus, if Company X wants its content to be displayed all day, but Company Y wants its content to be displayed only for a specific hour, rights to the cell at issue will be given to Company Y for its selected hour and then to Company X for the other time slots. This method is preferred where competing content providers allocate a limited budget to a time period, to minimize the chance that the content providers will use up their entire allocated budget.

In the case where two competing content providers make the same bid and have the same schedule priority number, the system would then consider each content provider's application priority number. A content provider's application priority number correlates with the number of different application categories per cell it selects to bid on. For example, if the system provides 19 total application categories that a content provider can choose from, the application priority number could range from 1 to 19 points (one point for each category selected). If Company X selects only 2 applications (an application priority number of 2) and Company Y selects all 19 applications (an application priority number of 19), then Company Y will win all the rights to the cell for the selected time slot.

In the case where two competing content providers make the same bid, and have the same schedule priority number and application priority number, the system would then consider each content provider's timestamp (time of first bid). That is, if Company X submitted its bid an hour before Company Y, Company X would be allocated rights to the cell and time slot at issue. In other examples of hierarchal methods, the winning bid to a cell or set of cells can be determined by assigning different priorities to the bid-win criteria. For example, the priority of the criteria could be (a) the bid amount, (b) which company made the first bid (timestamp), (c) lowest schedule priority number, and then (d) highest application priority number.

Another factor which might be used to determine a winning bid is the budget range for bidding. The budget range for bidding entails a bidding content provider setting a bid budget range for the cells it selects. By setting a bid budget range on a cell or set of cells, a content provider's bid can be increased automatically (e.g., up to a maximum amount) if is about to lose the bid. For example, if Company X sets a bid budget range of $0.50-0.75 and has a bid for a cell of $0.50, a bid of $0.51 by Company Y would cause Company X's bid to automatically increase to $0.51. Thus, Company Y's bid would only be posted on the system once it exceeded $0.75. In some embodiments, the system can allow bidding content providers to set up alerts and/permissions to increase its budget.

Allocation of a cell in the virtual grid can be by auction as described above. Any suitable auction form might be used, e.g., an English auction, a Dutch auction, proxy bidding, a sealed first-price auction, a Vickery auction, a buyout auction, or a combinatorial auction. The auction can be one with or without a reserve. Rights to a cell/time slot are typically, but not always, awarded to the highest bidder. Bidding can be in real-time or time-delayed, and take place over a communications network such as the internet. Any suitable means of communicating bid information might be used, e.g., wired and/or wireless (e.g., RF, Bluetooth, or IR) communications systems.

Bid for placement can range from—highest bid, real time, minute, hourly, day, week, month, year, bid to lease, bid to purchase, bid to budget, bid to billboard, etc. Bidding on the cells could range in two or three dimensions. Bidding on the cells can range in altitude. Future ability of bidding on integration of other advertising mediums. Bidding might be on an individual virtual cell or group of cells or for a "package," e.g., a content provider bids on the rights to a content provision package including: a text advertisement on a search engine, fixed billboard, and a virtual cell. In addition, a bidding system might use a bidding algorithm that interacts with the cells similar to the way bidding for stocks in a stock market system such as NASDAQ or the NYSE operates. A bidding algorithm might utilize a variable such as a quantity correlated with demographic information of a certain cell or set of cells (e.g., population density, income per capita, spending per capita, spending on select goods or services per capita, number of uses of information playback devices per time period, or percent of types of applications used by information playback devices) and bidding activity.

In one auction variation, the bid increment is a predetermined minimum amount (i.e. a Company X must bid Company Y's bid plus at least the bid increment in order for its bid to post). Although the current highest bid can be sealed, it preferably is always displayed to spur bidding competition. As an example of bidding on an auction-style listing, bidding for a cell can start at $1.00 and the bid increment can be set at $0.20. If Company X bids $3.00 for the cell, and no other bids have been placed, the system can display that the current winner is Company X, with a bid of $1.00, and that the minimum allowable bid is $1.20, which is equal to one bidding increment above the winning bid. If Company Y then bids $2.00 for the cell, the system will still display that the current winner is Company X, with a bid of $2.20, which equals the second-highest bid ($2.00) plus the bid increment amount ($0.20). The system will also display that the minimum allowable bid is $2.40, one bid increment above the winning bid. If Company Y then bids $5.00, the system will display that the current winning bidder is Company Y, with a bid of $3.20, which is equal to the second-highest bid ($3.00) plus the bid increment ($0.20). If Company Y were to win the auction, it would have to pay the amount equal to the winning bid ($3.20), even though its previous bid was $5.00.

In one example of the operation of a cell-allocation system of invention, a content provider bids for the right to place content such as information, incentives, and advertisements in one or more cells anywhere in the world so that such content can be viewed on an information playback device such as a wired or wireless device running a script that allows display of transmitted content. A content provider can access the system via the internet or other communications network. A user interface or webpage of the system can have a menu or series of tabs through which a content provider can navigate around the website. A content provider, after providing an authorized username and password, can click on a "Billboards" tab to bring up a webpage for creating and/or managing particular campaigns and billboards. A campaign is used to organize related billboards into groups. The user can add or delete campaigns and enter a unique name for each campaign.

The Billboards page is arranged to allow a user to add, edit and delete billboards. As an example, the Billboards page might include several fillable fields for identifying and performing certain actions. For example, a billboard name field can be used to assign a name identifying a particular billboard (e.g., a postal code). The Billboards page might also have a campaign selection field that allows a user to assign one or more (e.g., 1, 2, 3, 4, 5, 6, or more) campaigns to a particular billboard. The Billboards page might also include a Billboard text field in which a user can enter additional text which can be displayed when a consumer views the content on an information playback device.

A "Billboard Banner" field might also be included on the Billboards page. The Billboard Banner can be filled with the first image an information playback device user sees when opening a certain application or website. In some embodiments, a content provider can upload an image in a "billboard image" field on the Billboards page. The billboard image is the image an information playback device user sees after clicking on (or otherwise selecting) the banner image. The banner image is generally smaller (e.g., 314 pixels wide by 66 pixels high and in a JPEG format) than the billboard image (e.g., 314 pixels wide by 246 pixels high and also in a JPEG format). Of course, the banner image and billboard image could be of any suitable size, and additional image fields could also be added depending on the configuration of the system and information playback device.

The Billboards page might also include a "Web Link" field into which a URL can be entered. When an information playback device user clicks on the Billboard image, the information playback device directs its user to a website associated with the URL. A "Map Identifier" field might also be included on the Billboards page. In this field, a content provider can enter the name of its business and/or the business' address which can be transmitted to a mapping application on an information playback device. If a keyword (e.g., name of business) is entered into the Map Identifier field, all or some of the business' locations in the information playback device vicinity can be displayed.

The Billboards page can also include a video link field and/or an audio link field. A content provider can enter a URL into video link field. The URL can include a video file in a format such as an .MPG file (or any other suitable video file format) on a web server or link to a video file such as a YouTube link. If an .MPG file is used, the video file will be played in the information playback device's media player. If a YouTube link is provided, the YouTube application will be launched and the video will be displayed through the YouTube application. Similarly, a content provider can enter a URL into audio link field. The URL can include an audio file in a format such as an .MPG file on a web server. If an .MPG file is used, the audio file will be played in the information playback device's media player.

A "Phone Number" field can also be provided on the Billboards page. A content provider can enter a telephone number into this field so that an information playback device user can call the content provider or another party associated with the telephone number. In addition, the Billboards page might include an "Age Rating" field. By entering an age rating [e.g., 4+ (ages four years and older), 9+ (ages nine years and older), 12+ (ages twelve years and older), 17+ (ages seventeen and older), or 21+ (ages twenty-one and older)] in this field, the content provider can control or suggest which users are of an age suitable for the content provided to an information playback device.

To navigate to individual billboards, a user can click on the campaign name in the campaign list to populate the billboard list with the billboards attached to that campaign. The user can then click on a billboard's name to view, edit, or delete the billboard. When deleting a billboard, a confirmation window will be displayed to cancel or confirm the deletion. If a billboard is currently in use in a Location (see below), the Location and Correlating bid will be placed on hold.

A content provider can click on the "Locations" tab to bring up a webpage that allows a user to select specific cells or groups of cells in a virtual grid. Groups of cells can be organized in a hierarchal fashion such as Countries/Territories, States/Provinces, Cities/Regions, and Postal Codes. The Locations webpage is arranged to allow a user to select groups of cells using a location browser or a map application. In the Location webpage, a user can first select a campaign to manage locations for (e.g., using a drop-down menu) and then select one or more locations that the campaign will be associated with. A location browser application on the website can be organized in a tree structure that can be expanded or collapsed in a parent/child arrangement. The top level in the tree can be a country, the next level can be states or provinces, then cities/regions, and finally regions defined by a postal code (which can be a cell).

The Locations webpage can include a check box or other selection function next to every parent and child location which allows a user to select or de-select locations. If a user clicks on a location name in the map on the webpage, a window will appear next to the cursor with a check box allowing the user to add or remove the location using that check box. The system can be arranged to provide multiple tools to navigate the map. For example, a tool can allow a user to enter a location in an "Enter Location" search box. The Enter Location search field allows a user to enter location information such as a country, territory, state, province, city, region, postal code or street address. The map can be moved by clicking the arrows in the border around the map or using the slider tool located below the map to zoom in or out. Clicking on "Find Location" will update the position of the map, e.g., to be centered on the location entered into the Enter Location search field.

When the map is zoomed to the cell level, a grid overlaying a street map appears on the webpage. The grid divides the map into virtual cells each labeled with a unique identifier (e.g., in numeric, alphabetic, or alphanumeric format). A check box or other selector allows a user to select or deselect cells. Clicking on the arrow next to a cell's check box expands the identifier window to reveal a radius variable field, the average daily impressions for that cell (i.e., average number of times the content is pushed to information playback devices in a cell), and suggested minimum bid for that cell. When entering a number into the radius field, all the resulting cells that are within that radius will automatically be selected and added to the user's selected locations. In addition, the "open rate" (the number of times the content is selected by users of information playback devices in a targeted cell) can be tracked and displayed.

The average daily impressions and suggested minimum bid can be updated when the identifier window is expanded to provide real time results. A colored box in the identifier window can be employed to graphically represent the bidding bracket currently taking place in the cell, e.g., indigo for $0.10-0.20, blue for $0.21-0.30, yellow for $0.31-0.40, orange for $0.41-0.50, and red for $0.51 or more. When viewing the map at the cell level, a color key can appear to illustrate the values for each colored square. In other embodiments, other devices for displaying the volume of activity might be used, e.g., a gradient such as an icon that darkens as activity volume increases or an icon that grows in size or complexity as activity volume increases.

After managing locations, a user can save the selected locations or not accept them (e.g., by selecting "undo changes"). Saving selected locations locks in the selected locations and allows a user to start bidding on those locations. Selecting "undo changes" reverts the system to the previously saved locations, if any. When a user saves locations and has removed a location that is currently in use in the bidding section, a notification will ask the user to confirm the removal and notify that this location will be removed from the bidding section.

For bidding on cells, a content provider can click on the "Bids" tab to bring up a webpage that allows a user to submit bids for the right to place content within selected individual cells within the virtual grid, e.g., on a pay per impression (PPI) basis. Thus, content providers can place a maximum budget on individual cells, and target consumers in a risk-free platform (i.e., once the budget is exhausted, no further charges will be incurred). The system can also be arranged so that content providers do not pay for an impression unless and until an application associated with the impression is opened in a selected cell.

In the bids webpage, a user can choose a campaign it would like to manage bids for. The campaigns can be presented in a drop-down menu above the location list. After selecting the campaign, the locations associated with the campaign appear in the location list. After clicking on a location, a bid window appears on the webpage. In this window the user can enter a daily budget for the selected location, a maximum bid per impression (Max Bid), a billboard to be associated with the selected location, a target application and/or one or mobile website categories (Target Categories), and dates and times when the bid will be active. The daily budget is the maximum amount the content provider wants to spend for that location per day. When the maximum amount is reached, this location will no longer be active. Future means of targeting can be based on one or more (e.g., 1, 2, 3, 4, 5, 6, 7, or 8) of the following: market segment to which a particular good or service is marketed; age; gender; geography; socio-economic grouping; technographic (characteristics & behavior) or any other combination of demographics; products; services; and usage.

The Max Bid entered determines how much the content provider will be charged every time an information playback device displays a billboards banner in an application or mobile website in the cell. This number can be used to determine which content provider is the highest bidder for the cell. A Choose Billboard area can display all the billboards associated with the campaign that has been selected. A content provider can choose (e.g., by highlighting or clicking on) the particular billboard to be shown at the selected location.

The Target Categories section on the bids webpage allows a content provider to select or deselect which application categories and mobile websites it wants the selected content to appear on. This category can be arranged to select all categories as a default. The billboard scheduling area on the webpage allows a content provider to select a date range for its bids on a location to be active. A content provider can also select what days of the week and within those days, what times of the day a bid for a location will be active. After saving the settings, the bid becomes active in the bidding system.

A content provider can also choose to put its bid on hold by selecting a check box on the webpage. Putting a bid on hold freezes the bid until the box is deselected. Similarly to applying settings for an individual cell, the system might also be arranged to allow the foregoing settings to be applied in a parent location encompassing multiple cells. For example, when settings are made for the location zip code 60601, the bids webpage can have a checkbox that when selected applies the parent settings to a particular cell within the 60601 zip code. While the settings will remain the same, the daily budget per cell can be calculated by dividing the total budget set for the parent location by the number of cells selected. For example, if $1000 is set as the maximum daily budget for the location zip code 60601 and ten cells within the 60601 zip code are selected, the maximum daily budget per cell would be $100. A content provider can override these setting by deselecting the check box for using the parent locations settings, so that a content provider can provide custom setting for an individual cell. The bids webpage can also include a reference map that can update to graphically display a selected location on a map.

The system described herein might also be configured to provide application developers use of the cells for advertising their applications with little or no charge, e.g., for cells not allocated to a paying content provider. In the system, one or more cells/time slots in the virtual grid can be assigned to an application developer. Information playback devices within the assigned cell/time slot can display a developer's banner advertisement which when selected by a user can redirect the playback device to the application. The application can include one or more pay-per-impression advertisements supplied by the cell-allocation system's owner, and revenue from such pay-per-impression advertising can be shared by the application's owner and the cell-allocation system's owner.

The system can be arranged to provide application developers code and format to place advertisements and share revenue. In this regard, the system can include an applications and sites webpage which an authorized developer can access over a communications network such as the internet. The applications and sites webpage is configured to allow a developer to view, edit, delete, and add applications, mobile websites, and promotional content to their account. When adding a new application, a developer can enter a unique application name used to identify the application in an applications and sites list. A developer can, for example, enter text information regarding the application which will be shown when an advertisement for the application is viewed in an information playback device. A developer might also choose a banner image and advertisement image for its application, as well as a mobile platform option (type of information playback device) such as an Apple iPhone, Google's G1, or RIM's Blackberry Storm. A developer can also select a language the application displays text in, e.g., English, French, Chinese, or Spanish.

The applications and sites webpage might also include an application category field that allows a developer to select an application category (or channel) such as social networking, communities, automotive, business, computing & technology, consumer electronics, health & wellness, current affairs & politics, digital culture, PC & video games, travel, contextual search, contextual search downloads, sports & recreation, portals, arts & entertainment, or news & information. The bidding systems and methods described above can be arranged for bidders to bid on rights to place content selectively in one or more of the channel categories. For example, the bidding system might be arranged so that a bidder might be able to bid on only selected applications, channels, or network subsets (e.g., one or more of mobile telephone networks, transit networks, or mobile website networks) within a target cell or set of cells.

In addition, a download link field might also be included in the applications and sites webpage. A URL can be added to this field so that when an information playback device user selects the download link using the device, the user will be directed to the link that is provided to download an application. An age rating field which functions as described above might also be included in the webpage. After saving the application to the system, a developer can review the information entered and download a developer toolkit which contains code and tools for incorporating advertisements into its application. This code might include a unique key for every application added to an account. The system owner can control developer content transmission, e.g., so that no advertisements are pushed to an information playback device until the system owner has approved a proposed application.

The applications and sites webpage can also allow a developer to add a mobile website to the system. A mobile website page can contain fields in which a developer can add the name of a mobile website, text describing the site, a banner image, an advertisement image, a language, a website category, a website link, and an age rating. Information can be added to these fields as described above for other aspects of the system. An information playback device in selected cells/time slots can display the banner image and can be activated by a user to display the advertisement image. Selecting (e.g., clicking on) the advertisement image (or in some cases the banner image) redirects the information playback device to the website link URL where the mobile website is located.

In certain embodiments, the methods and systems of the invention can utilize mobile displays such as touch screen equipped displays. A preferred mobile display can be of any suitable size and can include a digital display, a geolocation component for determining the location of the display (e.g., by longitude and latitude), and a component for communicating with a server including a database storing information that can be transmitted to the digital display. Mobile displays can range in various sizes, can be installed internally or externally to vehicles (e.g., bicycles, automobiles, buses, trucks, taxis, trains, aircraft, and boats) or other various moving items (e.g., backpacks or clothing on a person). As a display enters a first cell as it moves through a grid, it can query and receive information (e.g., an advertisement) from the server such that the display with playback the newly acquired information. The information displayed can be determined by the server according to the bidding process described above. As the display leaves the first cell and enters a second cell, the information displayed can change.

In one variation of the foregoing, the information on the mobile display can involve text messaging (e.g., using SMS or MMS applications). For example, the display can play a message (which can be location relevant; a merger of an information provider's content and the system provider's content; and/or include a physical or web address) that invites the viewer to text message an offer id number to a telephone number of the system or information provider (e.g., Text 1234 to 555-555-1234). The system or information provider can then transmit more details of the offer or a weblink to the mobile display, e.g., via a text message. In touch screen equipped displays, a user can also perform various tasks using the touch screen application, including, e.g., "see on a map," "send to yourself," "send to a friend," "view video ad," and "hear audio ad."

In certain embodiments, the methods and systems of the invention can utilize fixed displays such as digital billboards on the side of highways. A preferred fixed display includes digital display, a component for communicating with a server including a database storing information that can be transmitted to the digital display, a component for indicating the displays fixed location, and, optionally, a touch screen interface. The fixed display can be configured to operate similarly to the mobile display described above.

The methods and systems of the invention might also incorporate a user reward program, wherein, for example, a viewer can collect points for clicking on content displayed on an information playback device. The collected points can be traded for goods and/or services. To use the program, a user would first have to create an account in a process that would include providing the system operator with his or her personal and perhaps demographic information. The system can be configured to track the users activities on the system such that content delivery can be specifically targeted to the user based on these activities. Filters may be implemented to determine if the user has completed the activity needed to receive the reward points. A filter, for example, might include a question in regards to the displayed content, enter a CAPTCHA code, interactive coding, etc. When the user passes the filter, he or she is rewarded points.

The methods and systems of the invention can utilize search engines. One example of a search engine logic is: when a user enters a search keyword into a search engine field, the resulting records are filtered by the current cell in which the user is located, and the user can set preferences on how many surrounding cells he or she would like to see results for. As another example, the system can serve advertisements and offers that are filtered by the user's current cell location with relation to the keywords entered into the search engine.

The methods and systems of the invention can also include other features. For instance, a cell lottery can be used wherein periodically a cell is selected at random, and users of the cell during that period will receive a reward or discount such as application developers receiving all of the revenue from that cell for that day, double reward points, prizes, etc. In another variation, in cases where content provider has uploaded more than one offer in a campaign that targets the same category, the offers can be randomly delivered to information playback devices in a selected cell. In some embodiments, default rules (e.g., a default image that the device has determined, a default image that the system provider has determined, automatically hide the content display area, etc.) are used if an information playback device cannot connect to the internet and/or is not able to establish the device's location.

To offer one or more deals to a group of people within one or more cells of a grid, a Group Deal can be created. The Group Deals allows the various systems described herein to offer discounts to groups of up to a predetermined number of people, so that they can collectively redeem an offer within a cell. As an example: Mary's Cupcakes offers (in the cells selected by the business) a free cupcake to the next 50 customers who view the offer and visit its store to redeem the offer. In this example, Mary's Cupcakes would login to the system, select "buy the way (group offer)", upload a message stating the offer, select the number of customers to limit the offer to, select area on map, bid and post. A person in a given cell with participating applications and media outlets would view the Mary's Cupcakes offer, and if interested, could select "redeem" offer on his mobile display. In response, the system would give the person an option to email the offer (e.g., a coupon) to him or show the offer or coupon appearing on the mobile display in person at store. The system can also be configured to allow local businesses and others to offer coupons through a grid within a cell that utilizes a bid system with the variable to control the amount of people that redeem the offer.

The system might also be configured to transmit "Create Charity Offers" within one or more cells of a grid so that the user of the mobile display can make a donation in the amount of his choice to the charity of his choice each time someone claims a company's offer within a given cell of the grid.

In another aspect, the system can include a component to detect a mobile display's IP address in order to pinpoint desktop or mobile computers in the grid in order to determine cell logic to deliver relevant information.

The system might also be configured to allow a mobile display user to obtain loyalty deals, i.e., deals only offered to those mobile display users who have redeemed a threshold number of offers from a business within one or more cells of a grid. For example, if store X wants its customers to buy 10 "special offers" over a given time, the customer selects "redeem" on his mobile device and to a database keeps a record of redemption by that customer. After the customer buys 10 items in this manner, a loyalty offer (e.g., a coupon, discount, or other reward) is sent to the customer (e.g., directly to his mobile display device, by e-mail, by regular mail, etc.). In one variation, loyalty virtual punch cards are used in conjunction with one or more cells in a grid. Consumers are targeted loyalty offers and/or redemptions based on a consumer stopping into the business and scanning a barcode (QR, etc.) on a poster, paper, package, or the like via scanner or camera. A consumer might also accumulate redeemable loyalty program points by checking into one or more cells within a grid.

Any kind of organizing or offerings that include a "check in," "likes," or "step in" might be used. Barcodes, QR codes, NFC (near field communication), coupon codes, passwords, number/text identifications, etc. that can either be unique to a cell within a grid, and/or only activated or "redeemed" in cells/locations determined by a user (advertiser) might be used in the systems of the invention.

Use of one or more cells within a grid can be tracked such that a pattern of consumer purchasing or location behavior can be determined. The system can then make recommendations based on those patterns as the consumer travels. For example, a consumer lives in Chicago and just traveled to Miami. Based on the consumer's activity on Michigan Avenue in Chicago, the system would recommend that the consumer might enjoy Lincoln Ave in South Beach. The system might also be used to create custom "consumer segmentation" within a grid. As examples, it could segment a population as "soccer moms", "concert goers", or "business travelers" and target content according to such segmentation.

In the systems of the invention, goods and or services might be tagged or identified using barcodes, unique codes, UPCs and the like within one or more cells of a grid in which mobile displays communicate online to identify the price and/or location of the goods and/or services closest to a particular cell in a grid. For example, a consumer can scan or type in the UPC code of a product into a mobile display device. The system can then tag the product to a cell in a grid and then query the internet to see if there is a location near or within the cell, and then transmit to the mobile display device the closest point of purchase for the product.

The systems of the invention might also be configured to allow a consumer to identify goods and/or services (through different means—barcode, unique codes, UPC, etc.) within one or more cells of a grid and place those goods and/or services in a virtual "shopping bag." Additionally, the systems might be configured to alert, make aware or recall such identifiable goods and/or services within one or more cells of a grid in a virtual "shopping bag". For example, if a user is in Los Angeles and sees an ad (or saw it in a store) for a new brand of cologne, the user can save that ad, tag the brand, and/or leave it in the user's "bag". If the user just traveled to New York and opens the "bag" or other saved file, the system will notify the user of where the saved products/brands/interest might be found in one or more cells in New York.

In other aspects of the invention, the systems described herein can be configured to allow social networking (e.g., sharing data, communicating, or social interaction) within a grid. For instance, "breadcrumbs" can be used within the system to share and view things that a user's group of friends have a mutual interest in. The systems might be configured to transmit data based on location and the consumer's interest and adjust as the consumer moves around a grid. In one variation of the systems of the invention where a user is assigned a unique ID after registration, the ID can be used to associate the user's interests with his location. Additionally, this unique ID can be used to as "breadcrumbs around" grid "identifiers" for the user and his friends. The systems might also be configured such that a user can organize his own data via cells he has selected to leave "breadcrumbs" in.

The systems of the invention can also be arranged to provide customer users a percentage of revenue from online or in store purchases stemming from an advertiser's offer made via the system. In another aspect, the systems of the invention might be configured to offer a "placement to purchase" solution where information is sent to a user of a mobile display device which causes the user to make a purchase based on the sent information sent. The systems of the invention might also offer a user the ability to organize data, content or information based on the user's history (actions they have taken on offers, ads, content, etc.), user preferences, and/or an algorithm that indexes the user's social network on what is trending amongst the user and his friends in the area. These trends come in the form of friends leaving "breadcrumbs" in a cell, friends posting on social networks in which a system of the invention aggregates the content to determine location keywords and brand/product keywords, and the users own posts.

The systems of the invention might also be arranged to provide time-limited incentive offers within one or more cells of a grid. For example, a mobile display can display to a user an offer from a store near the mobile display's location, and require to user to redeem the offer within 5 minutes of the offer first being displayed.

The systems of the invention might also be configured to work with a mobile operating system wherein the function of a mobile display device using the mobile operating system would relate to the devices location within a grid. For example, content (e.g., weather, sports, offers, friends, etc.) displayed on the device via the mobile operating system could differ between cells in a grid and change as the device moved among grids.

The systems of the invention might also be configured to organize and communicate within a grid with NFC (Near field communication), e.g., for check-in, information transfer, device pairing, work badge, coupons, offers, deals, incentive marketing, data collection, financial transaction, etc.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising the steps of:
   dividing, by a server, a geographical area into a virtual grid comprising a plurality of cells;
   receiving in first periodic intervals, by the server, from an application on an information playback device a location of the information playback device and identification data for the application on the information playback device;
   streaming, by the server, content to the information playback device;
   determining, by the server, a target cell of the plurality of cells using the received location of the information playback device;
   determining, by the server, a pattern of location behavior in the target cell;
   determining, at second periodic intervals, second content based at least in part on the pattern of location behavior in the target cell; and
   sending, at least in part, the second content to the information playback device.

2. The method of claim 1, wherein the location behavior is consumer purchasing.

3. The method of claim 1, further comprising the steps of:
   identifying, by the server, a content set from a plurality of cell content sets using the determined pattern of location behavior and the received identification data of the information playback device within the target cell; and
   wherein determining the second content is based at least in part on the content set.

4. The method of claim 1, wherein dividing, by the server, the geographical area into the virtual grid comprises generating the cells of the plurality of cells with about the same dimensions.

5. The method of claim 1, wherein dividing, by the server, the geographical area into the virtual grid comprises generating the cells of the plurality of cells based at least in part on longitude and latitude.

6. The method of claim 1, wherein dividing, by the server, the geographical area into the virtual grid comprises generating the cells of the plurality of cells in a hexagonal shape.

7. The method of claim 1, wherein dividing, by the server, the geographical area into the virtual grid comprises generating the cells of the plurality of cells in a square shape.

8. The method of claim 1, wherein dividing, by the server, the geographical area into the virtual grid comprises generating the cells of the plurality of cells based at least in part on population size.

9. A method comprising the steps of:
   dividing, by a server, a geographical area into a virtual grid comprising a plurality of cells;
   receiving in periodic intervals, by the server, from an application on an information playback device (a) a location of the information playback device in the grid, (b) identification data for the application on the information playback device, and (c) location behavior data for the information playback device;
   streaming, by the server, content to the information playback device;
   determining, by the server, a subset of a plurality of information playback devices corresponding to a segment of the population having shared characteristics using the received location, identification data, and location behavior data cell; and
   determining, at second periodic intervals, second content based at least in part on the pattern of location behavior in the target cell; and
   sending, at least in part, the second content to the information playback device.

10. The method of claim 9, further comprising the steps of:
    identifying, by the server, a content set from the plurality of cell content sets; and
    transmitting, by the server, the identified content set to the subset of the information playback devices.

11. The method of claim 9, wherein receiving the location behavior includes receiving consumer purchasing data.

12. The method of claim 9, wherein dividing, by the server, the geographical area into the virtual grid comprises generating the cells of the plurality of cells with about the same dimensions.

13. The method of claim 9, wherein the cells of the plurality of cells are defined by longitude and latitude.

14. The method of claim 9, wherein the cells of the plurality of cells are hexagonal in shape.

15. The method of claim 9, wherein the cells of the plurality of cells are square in shape.

16. The method of claim 9, wherein the cells of the plurality of cells are each defined by population size.

17. A system comprising:
   one or more processors;
   non-transitory computer-readable media storing computer-executable instructions, which when executed by the one or more processors cause the one or more processors to perform operations including:
      dividing, by a server, a geographical area into a virtual grid comprising a plurality of cells;
      receiving in first periodic intervals, by the server, from an application on an information playback device a location of the information playback device and identification data for the application on the information playback device;
      streaming, by the server, content to the information playback device;
      determining, by the server, a target cell of the plurality of cells using the received location of the information playback device;
      determining, by the server, a pattern of location behavior in the target cell;
      determining, at second periodic intervals based at least in part on the pattern of location behavior in the target cell; and
      sending, at least in part, the second content to the information playback device.

18. The system as recited in claim 17, wherein the non-transitory computer-readable media stores additional computer-executable instructions, which when executed by the one or more processors cause the one or more processors to perform operations including:
   receiving in the first periodic intervals, by the server, from a second application on a second information playback device a second location of the second information playback device and second identification data for the second application on the second information playback device, the second application causing the second information playback device to stream third content from the server;
   determining, by the server, a second target cell of the plurality of cells using the second received location of the second information playback device;
   determining, by the server, a second pattern of location behavior in the second target cell; and
   determining, at the second periodic intervals, fourth content to provide to the second information playback device, the fourth content based at least in part on the second pattern of location behavior in the second target cell.

19. The system as recited in claim 17, wherein the non-transitory computer-readable media stores additional computer-executable instructions, which when executed by the one or more processors cause the one or more processors to perform operations including:
   receiving in the first periodic intervals, by the server, from a second application on a second information playback device a second location of the second information playback device and second identification data for the second application on the second information playback device, the second application causing the second information playback device to stream third content from the server; and
   determining the pattern of location behavior in the target cell is based at least in part on the second location and the second identification data for the second application.

20. The system as recited in claim 17, wherein the non-transitory computer-readable media stores additional computer-executable instructions, which when executed by the one or more processors cause the one or more processors to perform operations including:
   identifying, by the server, a content set from the plurality of cell content sets; and
   transmitting, by the server, the identified content set to the subset of the information playback devices.

* * * * *